US008813219B2

(12) United States Patent
Natividad

(10) Patent No.: US 8,813,219 B2
(45) Date of Patent: Aug. 19, 2014

(54) METHOD FOR PRODUCING DYNAMIC DATA STRUCTURES FOR AUTHENTICATION AND/OR PASSWORD IDENTIFICATION

(76) Inventor: Alejandro V Natividad, Amarillo, TX (US)

( * ) Notice: Subject to any disclaimer, the term of this patent is extended or adjusted under 35 U.S.C. 154(b) by 0 days.

(21) Appl. No.: 13/593,287

(22) Filed: Aug. 23, 2012

(65) Prior Publication Data

US 2014/0059672 A1    Feb. 27, 2014

(51) Int. Cl.
| | | |
|---|---|---|
| G06F 17/30 | (2006.01) |
| G06F 21/46 | (2013.01) |
| H04L 9/00 | (2006.01) |
| H04L 9/08 | (2006.01) |
| H04L 29/06 | (2006.01) |
| H04L 9/32 | (2006.01) |
| G06F 21/45 | (2013.01) |

(52) U.S. Cl.
CPC *G06F 21/46* (2013.01); *H04L 9/00* (2013.01); *H04L 9/08* (2013.01); *H04L 63/0846* (2013.01); *H04L 63/083* (2013.01); *H04L 9/3228* (2013.01); *H04L 9/3226* (2013.01); *H04L 9/088* (2013.01); *G06F 21/45* (2013.01); *H04L 9/32* (2013.01)
USPC ............ 726/18; 726/2; 726/4; 726/5; 726/17; 713/156; 713/186

(58) Field of Classification Search
CPC ........... H04L 9/00; H04L 9/0813; H04L 9/32; H04L 9/3213; H04L 9/3226; H04L 9/3228; H04L 9/3231; H04L 9/3242; H04L 63/0807; H04L 63/0823; H04L 63/083; H04L 63/0853; H04L 63/0861; H04L 9/08; H04L 9/0861; H04L 9/0863; H04L 9/088; H04L 63/067; H04L 63/0838; H04L 63/0846; H04L 2463/061; H04L 2463/081; G06F 21/45; G06F 21/46
USPC .................. 726/2, 4, 5, 17, 18; 713/156, 186
See application file for complete search history.

(56) References Cited

U.S. PATENT DOCUMENTS 8,510,811 B2 *   8/2013   Kuang et al. ...................... 726/5
2013/0212674 A1 * 8/2013   Boger et al. ..................... 726/17

* cited by examiner

*Primary Examiner* — Thanhnga B Truong
(74) *Attorney, Agent, or Firm* — Donn K. Harms

(57) ABSTRACT

A method for generating a changing authentication input or password for a user is provided for accessing a computing device such as a smartphone or computer. Using objects displayed in sequential positions on a graphic display, and input strings of text or alphanumeric characters the user has related to each object, a password can be generated by placing the input strings in an order the same as the sequence. The password can be varied easily for each access attempt by changing the objects displayed and/or the sequence.

22 Claims, 5 Drawing Sheets

METHOD FOR PRODUCING DYNAMIC DATA STRUCTURES FOR AUTHENTICATION AND/OR PASSWORD IDENTIFICATION

BACKGROUND OF THE INVENTION

1. Field of the Invention

The present invention relates to information technologies. More particularly, the invention relates to a method for producing a data structure for password identification employing a dynamic graphic user interface.

2. Prior Art

In recent years more individuals have begun to rely on technologies such as personal computers, smart phones, tablets, and other devices in work as well as in their personal lives. Many of these individuals maintain personal information stored in these devices including addresses, passwords, emails, phone numbers, bank accounts, credit cards, social security numbers, family and friends information, and the like.

It is conventionally known that these electronic devices can require a password identification to allow the user access to the device and to the data stored within. This password requirement is most commonly seen on the 'logging in' screen of the devices, which occurs during the initial boot up of the software of the device. However, for added security, many individuals will also password protect select files, emails, and other desired information.

The reason for password protection is quite simple in that the device owner wishes to prevent an intruder, such as a third party hacker, thief, or the like, from gaining access to your device and obtaining your personal information. Otherwise, with the appropriate information an intruder can assume the device owner's identity online. Identity theft and computer fraud thus is one major concern, since a hacker or thief who obtains the owner's personal information such as a credit card number or social security number can immediately begin charging to a credit card or open a fraudulent credit line. Password protection of selected files and directories and of the device itself, is an owner's attempt to prevent such crimes from happening.

However, password protection is conventionally limited to a single data string input, such as alphanumeric characters, symbols, numbers, and combinations thereof. The user or device owner is required to remember that data string in order to input it correctly and gain access to their device, or to their email, protected folder, and the like.

Many downfalls are present with this conventional method. First, the user may have difficulty remembering the password, which can cause a severe problem if it is required to access their device, or a remote website. In such cases the user must navigate through tedious steps for obtaining a new password which conventionally involve answering personal questions and inputting other personal data to authenticate and validate their identity. As a result, in order to avoid this re-validation process, some individuals will choose passwords which are easy to remember and simple in nature. This of course provides minimal protection against theft, and frequently such easy passwords can be discerned by a smart thief who surveys the user's FACEBOOK page which can publish personal information about the user.

Second, single data string passwords can easily be discovered by third party hackers with computer abilities or with research and trial and error input. Once a password is obtained, all personal information for the user will be at an unauthorized party's fingertips. Hackers are getting better at obtaining personal information, especially on unprotected wireless networks as is often provided in popular public places like cafes, restaurants, and the like, or as noted by surveying a user's FACEBOOK page where the user may have unwittingly posted the password to remember it, or information which would lead to guessing the password.

Still further, some users who are more security conscious may continuously change their passwords. Although this method may help to keep a hacker or thief at bay, it of course may lead the user forgetting the changed password and having to go through the noted tedious steps of proving their identification. As one can discern, in an era of ever-faster networks and hotspots, with easy access by multiple users, the task of personal information security is more daunting that it should be.

As such, there is a continuing unmet need for a method employing software adapted at the task of producing a data structure or string for password identification which will provide security, but also provide only a user the ability to more easily remember or discern their password. Such a system should endeavor to employ a continuously changing graphic user interface (GUI) as a means for identifying the password and/or changing it and providing a means for the user to identify it. Such a method should produce a different required data structure (password) for each user at each authentication session (i.e. log in) thereby allowing the user to employ a dynamically changing GUI to determine the current password based upon pre-defined code criteria. Such a system should provide a means for generating or requiring ever changing passwords for users which can only be determined by the user's predefined criteria, but render hackers and identity thieves alike unable to obtain user information. Such a method should employ broadcast communication encryption.

The forgoing examples of related art and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF THE INVENTION

The device herein disclosed and described provides a solution to the shortcomings in prior art and achieves the above noted goals through the provision of a method for password identification for a user, employing software running on a microprocessor such as a server, and adapted at the task, of providing a user with a dynamically changing GUI. Generation of the changing GUI is provided through following a set of pre-defined user-criteria for generating an input data string representing a password, which can only be determined by the user who set the criteria.

In accordance with a first preferred mode, the GUI is provided in a sequence, a grid, or a matrix of dynamically positional user-viewable objects. The user pre-defines the set of objects, but not the position of the objects on the GUI. The objects can be one or combination of objects, from a group of objects consisting of pictures, images, phrases, questions, numbers, colors, colored numbers, and the like which are embedded into the background of a display as the objects.

In combination with the plurality of objects, the user additionally pre-defines a word-association with each respective object. For example, an object may be a picture of the user's dog, and the associated word may be the dog's name "Spot"; a picture of an elderly woman, preferably the grandmother of the user, may be assigned the word "Granny"; a question may be chosen and the answer is the associated word which is only known by the user; and so on.

With the plurality of objects chosen and easily remembered by the user, when a password is required, the GUI is presented to the user displaying a sequence of the objects, a grid (i.e. X-Y grid), or a matrix with the objects randomly positioned at various locations of the depicted GUI.

Prior to subsequent logins, the user also predefines the sequence or pattern criteria for selecting the objects positioned on the GUI, and sequentially inputting the text associated with each. By employing this pattern, and visually determining the objects, a number of which sequentially correspond to the user-known pattern displayed on the GUI, an authentication password is determined. The password is input by the user typing the corresponding dynamic word string defined by the users pre-defined words which are associated with the viewed objects in that particular sequence.

As a simple example, the GUI may be a simple sequence of three objects positioned in a row. The user first defines their preferred code criteria. For the code criteria, the user selects a plurality such as three images well known to the user and assigns word associations for each which they can easily remember. The user causes the words associated with the images or objects to be stored in a relational database.

In this example, IMAGE-1 is a picture of the user's mother, and the assigned WORD-1 is "mom", IMAGE-2 is a picture of the ocean and the WORD-2 is "vacation", and IMAGE-3 is a picture of a dog and the WORD-3 is the dog's name known to the users as "spot". It is particularly preferred that the images and word associations are personal to the individual user and not something that could easily be determined by a hacker or thief. For example, the image of the ocean may mean something very different to other people, but in this particular example it is a picture of the beach taken in a past vacation, thus, the word "vacation" is chosen.

For this simple example, the objects in the GUI will be presented in a row of 3 objects, therefor there are three positions of available in the displayed GUI, POSITION-1, POSITION-2, and POSITION-3 (counting left to right). The user and/or server selects a pattern of which the objects will be selected to define the password, and this pattern is made known to the user. Here we will arbitrarily choose the pattern of POSITION-2, POSITION-1, and POSITION-3. Thus far the user has defined all the criteria.

The operative employment of the example of the method herein would proceed as follows. The user upon starting their computer or at a login to a website, is presented with an authentication prompt (i.e. Log in page for a personal computer, email account, bank account, etc.). In this prompt the displayed GUI and a password input bar is presented to the user. The software running the system will randomly position three from a plurality of pre-associated objects stored in the database (in this case IMAGE 1 through 3) in a row and display it to the user. For this example, the displayed GUI using software adapted to the task at POSITION-1 shows IMAGE-3, at POSITION-2 shows IMAGE-1, and at POSITION-3 shows IMAGE-2.

Now, using the associated words for each object or image displayed, known only to the user, the password will always be defined by the dynamic word string consisting of a sequential string of those associated words from the group of associated words and objects in the database. The input words for each respective displayed objects will be typed using the user-associated words sequentially using the known and pre-determined pattern of selection.

Again, in this example the authentication pattern is POSITION-2, POSITION-1, and POSITION-3. Therefor, the password is the word string constructed from the words associated from the images in the above positional pattern, in this case IMAGE-1, IMAGE-3, and IMAGE-2. Therefor the word string for this password is "momspotvacation". The associated words are easily remembered by the user since the objects are photos or pictures of a very dear person, a fondly remembered place, and a pet. The user inputs this string into the password input window in the correct sequence, and authentication is verified by software adapted to compare the input words in the input sequence to the stored images and objects in the relational database. Since the sequence is known to the user and the words easily remembered, a correct string of words is generated and the user is allowed access.

Upon ending the authenticated session (i.e. logging out, turning off the device, etc.) the system employing software adapted to the task, then forgets the previously input password, and upon another authentication attempt (i.e. logging back in) the objects or images depicted in the GUI presented to the user may either be different from a group larger than the number of image spots, or at least displayed in a different order.

Using the predetermined sequence for input and the objects or images placed in the three positions, software adapted to the task will then determine a correct new password based on the newly ordered objects or images positioned in the GUI. Thereafter employing the same known sequence for the authentication pattern, the user can easily determine the correct word string for input of a totally different password.

Continuing this example, in this second instance the depicted objects or images positioned in the sequence in the GUI may now show the user; at POSITION-1 is shown IMAGE-2, at POSITION-2 is shown IMAGE-3, and at POSITION-3 is shown IMAGE-1. Therefor, the password set by the system, and determined by the user using the known authentication pattern or sequence, will be "spotvacationmom". Again, the images or objects depicted are known well to the user and not easily forgotten, but for most third parties, would be unknown.

One skilled in the art will realize that the complexity of the system and therefor difficulty for a hacker to determine the password can be increased by many factors. First, the total number of objects stored in group for a user in the relational database can be increased. Since the objects are preferably images of people or things well known to the user, the number of images or objects can be very large, and each associated to the word to that respective image causes the user to easily remember. This word association provides an advantage over prior art as it is a solely known to the user and preferably uses images or objects which are easily remembered by the user but would be virtually unknown to strangers.

Additionally, the GUI may present a longer sequence of objects, a grid of objects, or a matrix of objects and/or some changing in the sequence used for input for the grid or matrix. As such the authentication pattern can be one of an infinite number of patterns using an extremely large number of objects chosen specifically by the user. Further, the authentication pattern itself can be selectively changed by the user with each authentication process, or by the system which could provide the user an easily discerned clue on the GUI as to the required sequence for each session input.

Therefor the method herein provides a user with a dynamic rendering of objects or pictures in a GUI which may be viewed, and remembered, and associated with a word for determining an input for a password identification based off user-determined and easily remembered criteria. The system, when communicating across a network, may employ software adapted to the task of data encryption to further prevent hackers from obtaining information during the authentication process. However, even if some input data for a password at one session is discerned through electronic eaves dropping, since the password changes with each subsequent session, a stolen input password from one session would be useless.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

Objects of the invention will be brought out in the following part of the specification, wherein detailed description is for the purpose of fully disclosing the invention without placing limitations thereon.

BRIEF DESCRIPTION OF DRAWING FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings.

DETAILED DESCRIPTION OF THE PREFERRED EMBODIMENTS OF THE INVENTION

The method and system employing software running on a computing device or a server adapted at the task and having input components, visual display components, and network communication components adapted to the task, provides a means for creating dynamic data structures or 'word strings' employable for a password identification during individual sessions of use. The method is especially well suited for employment for access control to personal computers, cell phones, smart phones, and other computing-able or smart devices where a user can conventionally 'log in' prior to gaining access thereto, in order to protect personal information.

Briefly, the dynamic structure of the correct password for input at any given session is provided through the employment of GUI and software adapted to the task of depicting a sequence, a grid, or a matrix and/or predefined objects having respective word associations, known only to the user and system. In use, the user pre-defines a plurality of objects in a group of objects but not the position of the objects rendered on the GUI. The use of the term objects herein is not to be considered limiting and can include without limitation any discernable photo, drawing, picture, alphanumeric rendering, or other item which may be rendered by the pixels of a GUI in a manner recognizable to a user viewing the GUI.

Figure 5:
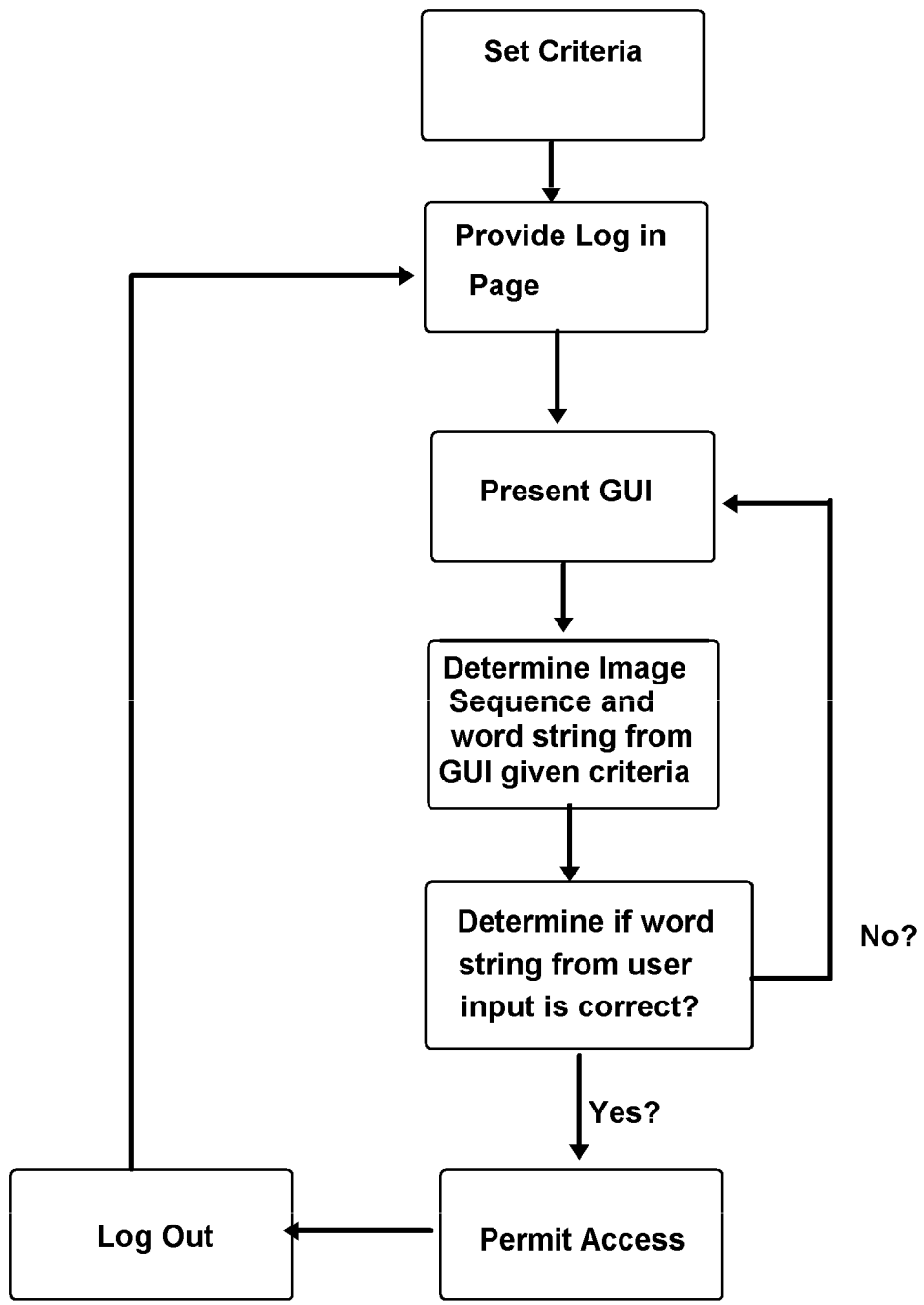
FIG. 5 shows a preferred schematic flow diagram of the dynamic system.
Figure 6:
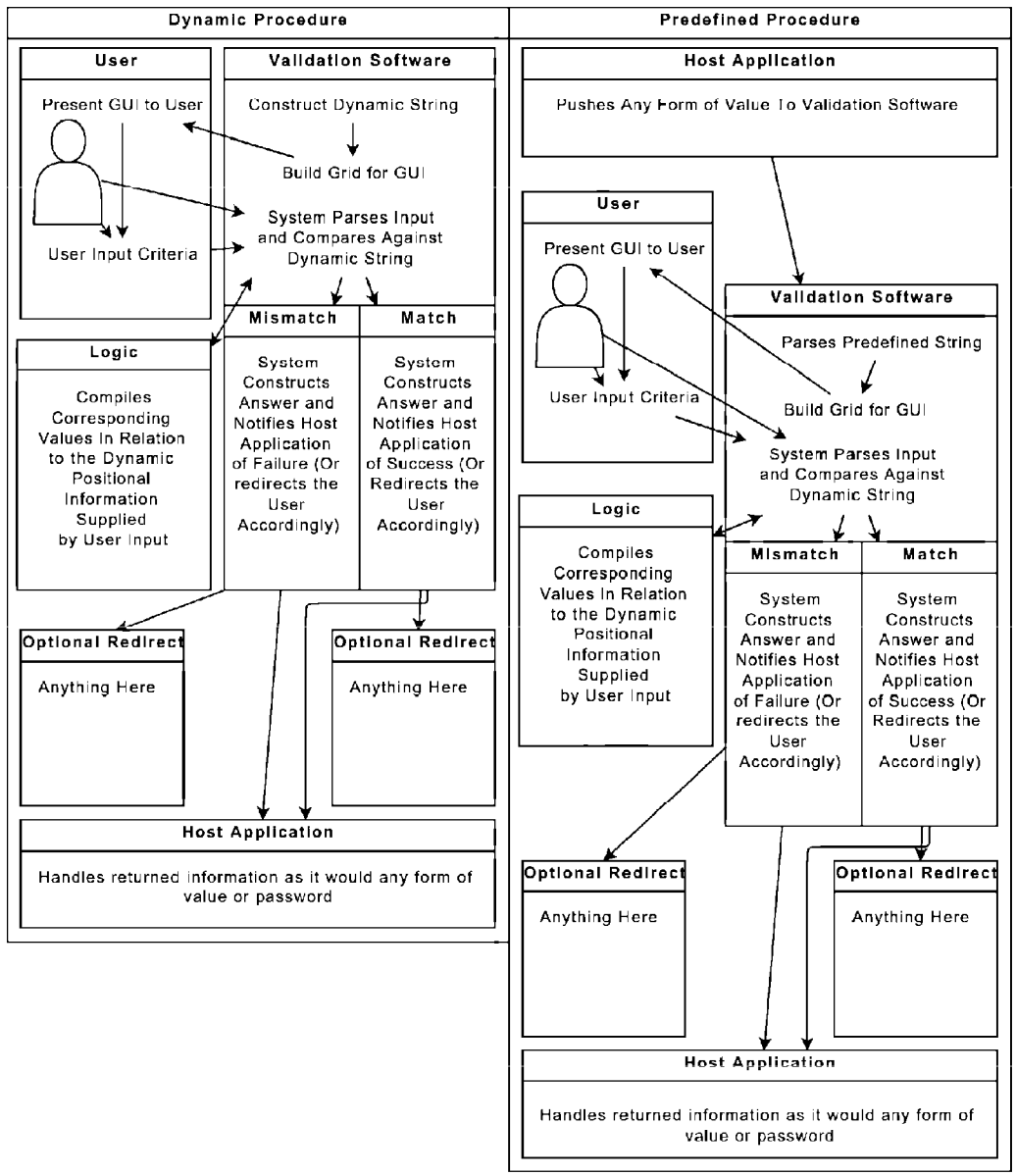
FIG. 6 shows a detailed flow chart of the preferred procedures of the invention.

The objects may be one or combination of objects from a group of consisting of pictures, photographs, images, drawings, illustrations, phrases, questions, numbers, alphanumeric characters, colors, colorized alphanumeric characters, and the like either rendered in pixels individually or embedded into the background of the rendered objects. For each respective object, the user additionally pre-defines a word or number string to be associated with each object. Flow chart and diagram representation of the method herein, not to be considered limiting, are shown in FIG. 5 and FIG. 6.

It is noted and anticipated that although the invention is shown in the following flow charts and preferred user interface displays in its most simple form, various aspects and features of the disclosed method may be modified when configuring the invention herein. As such those skilled in the art will appreciate the descriptions and depictions set forth in this disclosure or merely meant to portray examples of preferred modes of providing known object depictions to users for input of known text strings, within the overall scope and intent of the invention, and are not to be considered limiting in any manner.

Figure 1:
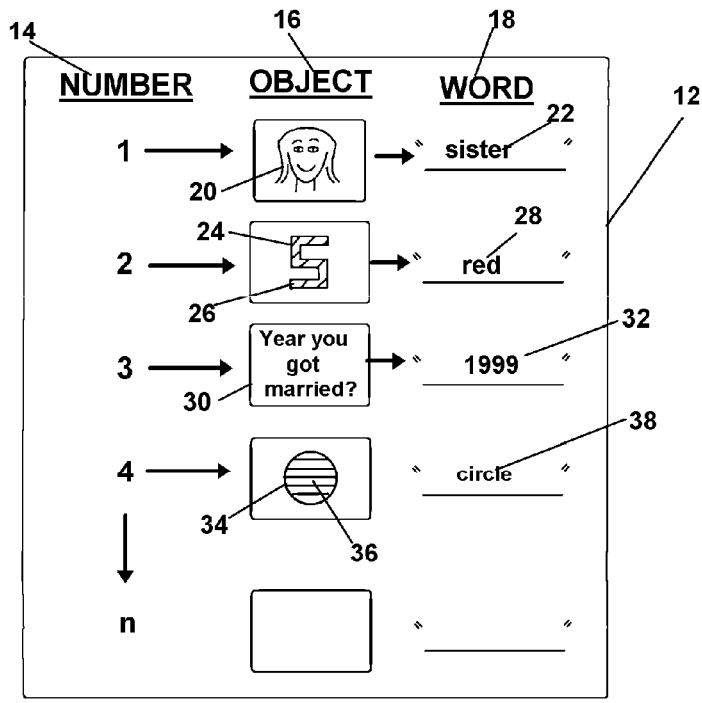
FIG. 1 shows a view of a preferred interface wherein a user inputs system criteria comprising objects (images, phrases, pictures, etc.) and word association.

Now referring to drawings in FIGS. 1-6, wherein similar components are identified by like reference numerals, there is seen in FIG. 1 a view of a preferred user interface window 12, such as one which may be presented to the user on any microprocessor enabled device having input components and a display such as an LCD screen or computer screen, such as smart phone, a laptop computer, and desktop computer, or any other device capable of running software and a visual display means in communication therewith.

The current window 12, shows a particularly preferred example of how a user defines a first set of input criteria. Preferably, software enabling the system herein and running on a computer device such as a server, or a smart phone, or a personal computer, employs onboard software adapted to the task of allowing a user to input criteria and associating such into a relational database. The user will preferably provide and define a plurality of objects 16 into a group of objects 16 each of which are easily recognized by the user when viewed, with respective word associations 18. The word associations 18, are input by the user as input strings, such as text and/or numbers. Each input string providing a word association 18 to a respective object 16, is later employed to identify objects 16 positioned in the displayed GUI for the user for generating password authentication for a session. This password authentication, employing software adapted to the task, is compared to a comparative authentication string which is assembled by the software by placing each of said input strings stored in said relational database and are associated with a respective object 16, using the known sequence which was displayed to the user.

Again, the object can be anything renderable in pixels on a display of a GUI which is identifiable when viewed by the user thereon. Anticipated objects include any one or combination of objects from a group of consisting of pictures, photographs, images, drawings, illustrations, phrases, questions, numbers, alphanumeric characters, colors, colorized alphanumeric characters, and the like. The key element being that the user easily recognizes the object displayed on the GUI and remembers the input string of letters or numbers associated with it. Additionally, the system may display the user-associated letters or numbers or input strings associated with the objects randomly on the GUI as a clue to the user needing one, but in positions where only the user will ascertain which input string matches which object.

As a current example, there is seen a first object being a picture 20 of a women. Further, as can be seen the user has chosen to associate the word 'sister' 22 with this first object which is a photo of the user's sister and easily remembered. During password authentication for any session, the user must later remember this input string which is the word association 'sister' the user assigned to the photo. Since the picture when displayed in a GUI will have a personal meaning known solely to the user, it will be easily remembered by the user but not easily discerned by anyone else. This use of user-known objects, especially if they are of someone like a grandmother or remote vacation spot visited by the user, will make it difficult if not impossible for hackers or identity thieves to obtain the user's password. Further since the password changes, even if copied by someone looking over the user's shoulder, the password at one session will not be the same at the next.

The user can provide any number of objects 16 to be stored in the relational database and associated with the user's input strings or word associations 18. A very large number of objects 16 easily remembered by the user is an especially good means for rendering the system unhackable, but still easily employed by a user who can easily remember the words associated with any given personal object 16.

As shown, a second object 16 is shown depicting a number five 24 which may be filled in with a color 26, such as red. The system may comprise a database of such supplemental objects for the user to choose from, aside from the user providing personal images or pictures. To further deter hackers, the user may choose to associate the word 'red' 28 with this object, as opposed to the number 'five', since such a word association may not be obvious to a third party.

A third object 16 is provided having a question 30 depicted by the GUI. The question 30 may be one previously written by the user, or may be chosen from a group of various questions stored in the relational database. In any case, the user will preferably provide such a question 30 which has a word association which is personal or otherwise known solely to that user and easily remembered. In this example the user chose "1999" 32 in response to the depicted question 30.

A fourth object 16 is shown as being a colored 36 circle 34 is defined by the user with the word association 18 being 'circle' 38, and in this case the color 36 is provided merely to throw off a hacker or identity thief. Additional objects 16 can be provided, herein shown numbered 14, one through 'n'.

Figure 3:
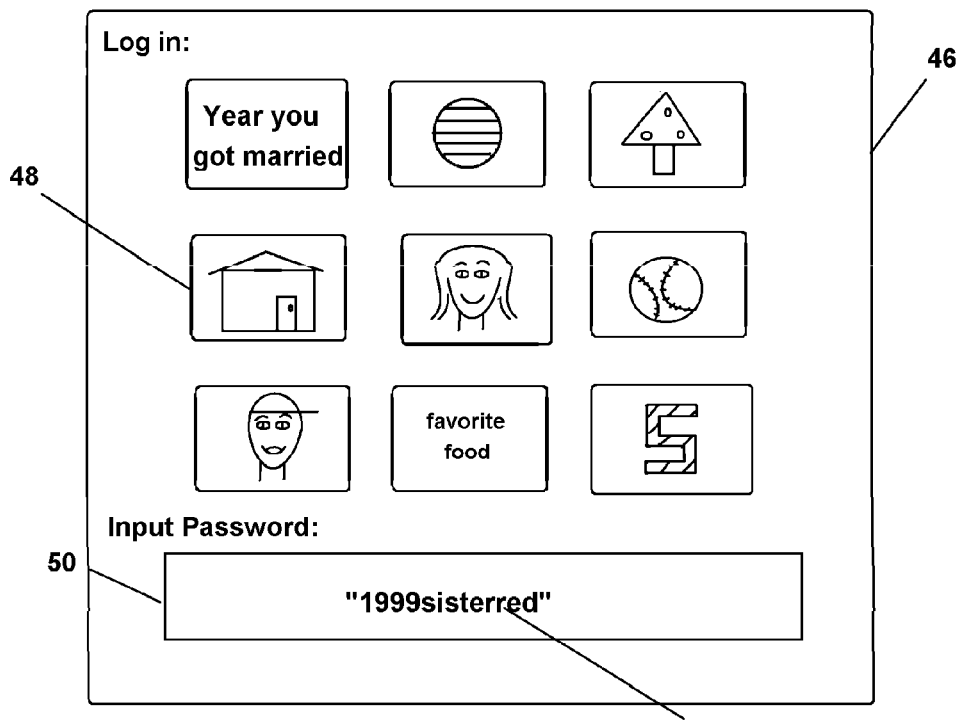
FIG. 3 shows a view of an example dynamic authenticating session, showing a 'log in' screen depicting objects on a displayed GUI having a 3×3 object grid.
Figure 4:
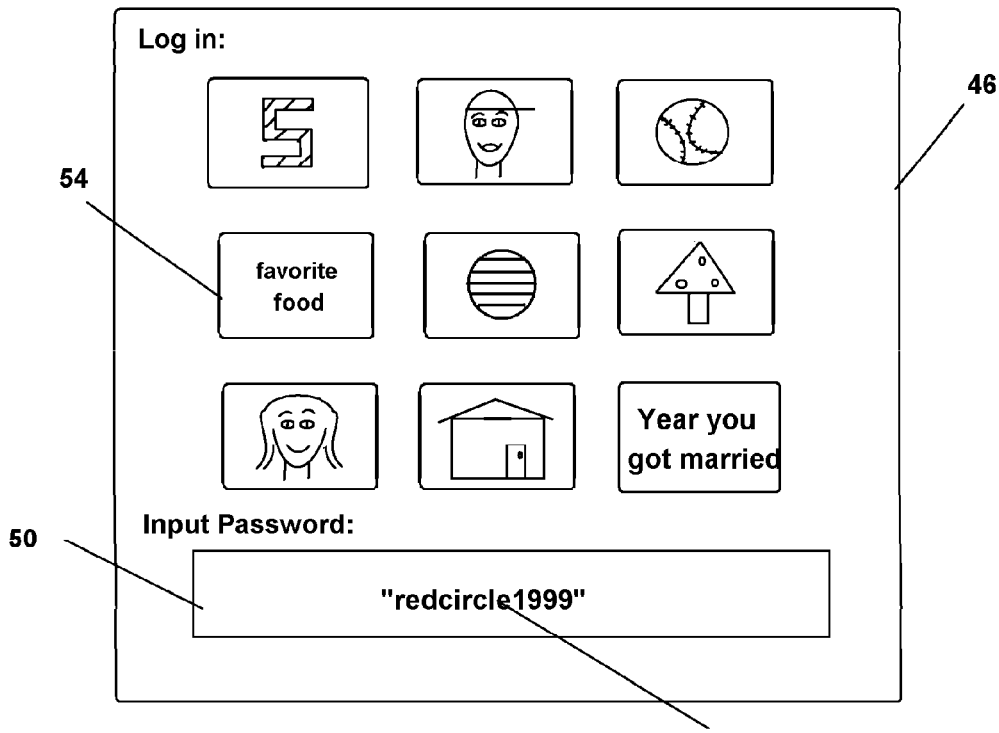
FIG. 4 shows a view of another dynamic authenticating session, showing a 'log in' screen depicting a displayable GUI having a 3×3 object grid in a different arrangement.

In operative employment, the method and system herein employs software adapted at the task of the random or changing positioning of the predefined objects 16 on a dynamic graphic user interface (GUI) (FIGS. 3 and 4). Again, the dynamic rendering of the objects 16 in the GUI can be a linear sequence, a grid, or a matrix, or some other means for a displayed sequence positioning, of the predefined objects 16 in the GUI, which is known to and provides an associated input sequence known to the user.

It is this displayed authenticating sequential pattern of the objects 16 in the GUI which is then employed by the user to determine the corresponding input sequence for the respective word associations 18 related to each depicted object 16 in the discerned authenticating sequential pattern. As noted the input authentication string assembled by the user, is compared by the software to a comparative authentication string formed by assembling input strings 18 stored in said relational database which are associated with objects 16 in the known and proper sequence. If a match occurs, authentication is verified. Those skilled in the art will recognize that the more objects provided and easily recognized by the user, and the more complex the displayed authenticating sequential pattern of those objects in the GUI employed for authentication, the more difficult it will be for a hacker or thief to obtain and/or discern the user's password. Further, in the event that a hacker gets the password for one authentication, during one session, the system herein will create a different user-discernible password using a different authenticating sequential pattern, and/or plurality of objects 16, during later authenticating sessions.

Figure 2:
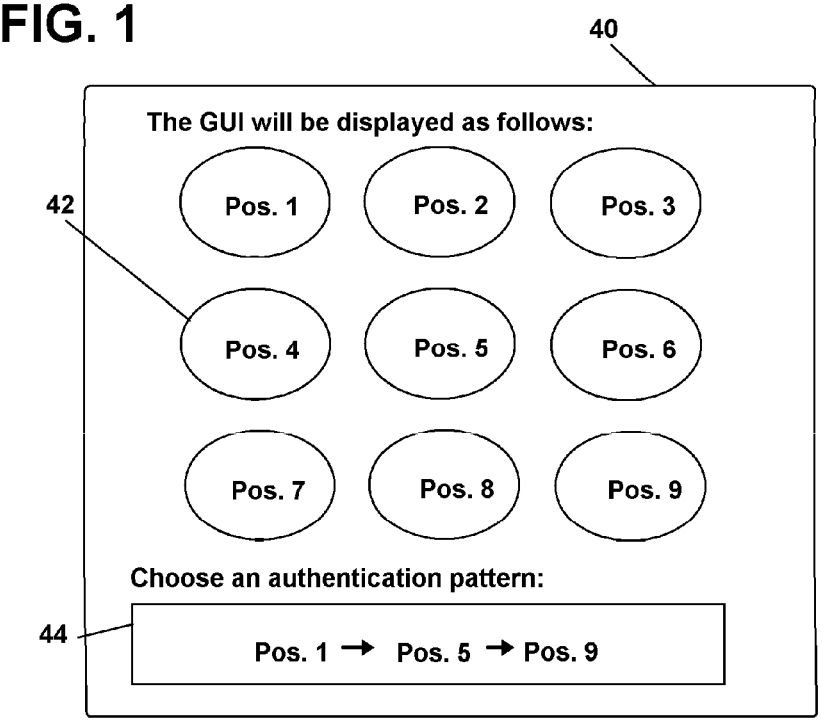
FIG. 2 shows a view of another preferred interface for criteria input for the authentication sequence/pattern.

FIG. 2 shows an example of another user interface window 40 showing a preferred means for inputting the criteria for the displayed authenticating sequential pattern for object selection for determining the password word string. The user may be provided with a sample of the GUI 42, in the current example showing a 3×3 grid, therefor having nine positions employable for the displayed sequential authenticating pattern 44. The authentication pattern 44 chosen by the user, or alternatively provided by the system, will be the displayed authentication pattern 44 in which objects 16 are positioned to be identified on the authentication GUI 48, 54 (FIGS. 3 and 4) when attempting an authentication session, commonly referred to as a 'log in'. In this example, the sequentially displayed authentication pattern 44 of the objects 16 is provided in the sequential pattern of Position-1; Position-5; Position-9. It is noted that the user must remember the displayed authenticating sequential pattern 44 in order to determine the correct sequence for input of the text strings to generate the correct password.

FIG. 3 shows an example authentication session window 46. The system will provide the user with a dynamic GUI 48, currently showing the 3×3 grid with the user's predefined objects 16 randomly positioned thereon. Given all previously defined input criteria, the user is able to determine the password through the identification of the objects 16 corresponding to the predefined display authentication pattern 44. Thereafter, by remembering the associated words 18 to generate input strings the user can construct a word string 52 from the individual input strings formed by the individual word associations 18 and thereby generate the proper password. In the example shown in the figure, the sequentially entered individual word associations 18 combine to input the password word string 52 which is "1999sisterred".

In preferred modes of the method, the GUI 48 may be provided to the user in a private broadcast, such that it is hidden from a potential hacker.

After an authenticated session, (i.e. after the user has logged in) and the user logs out, or shuts off the electronic device. The system will dump the previous password and create a new one based of a new random positioning of the users defined objects onto the GUI. FIG. 4 shows another possible authenticating session window 46 having a differently positioned GUI 54. As such, although the authentication pattern 44 remains unchanged, the positions of the objects 16 have changed and therefor the constructed word string defining the password will be different. In the current example, the new word string 56 is "redcircle1999".

FIG. 5 shows a flow chart representation of the disclosed method. For security purposes, if the user inadvertently inputs the word associations 18 and generates an incorrect word string 56 in the password input bar 50, the system may reposition the objects on the displayed GUI and present the user with a new one. For added security, it may be preferred that system only allows the user a certain amount of attempts, such as three attempts, before the system 'locks' the user out, i.e. prevents the user from trying additional attempts. In this event the user may have to wait a certain time period, or may be prompted to identify the objects in another way. For example, an option may be provided wherein all the predefined objects are shown and the user must input all if not a majority of the pre defined word associations in order to authenticate themselves as the user.

FIG. 6 shows a more detailed flow chart of the method herein.

This invention has other applications, potentially, such as gaming) and one skilled in the art can easily discern these after reading this disclosure. The explanation of the features of this invention does not limit the claims of this application, and other applications employing a displayed sequence of objects known to the a user to generate changing input passwords or authentication systems developed by those skilled in the art are intended to be included withing the scope of this invention.

Figure 7:
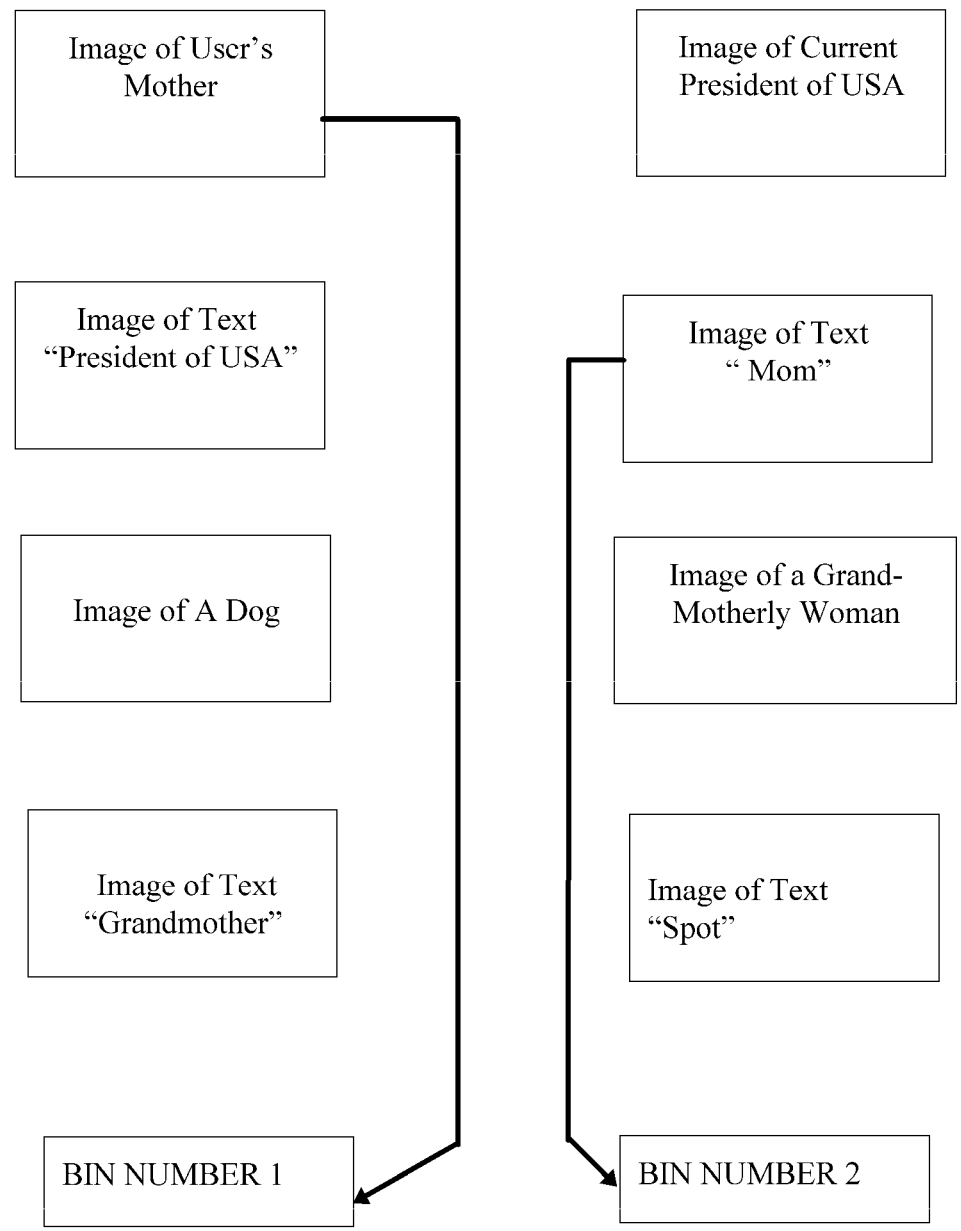
FIG. 7 depicts a non textual mode of the system herein wherein graphics pre-known to the user are mated and no keystrokes generated which must be transmitted over the network.

FIG. 7 shows a non textual mode of the system herein wherein graphics of individual objects which are photos or illustrations having a meaning or pre-known to the user, must be mated by the user to graphics of text or of another graphically depicted answer to the known objects on the display. In this mode, no keystrokes need be generated which must be transmitted across the network, or which might be recorded by malicious software.

Instead, the user has predefined deposit bins or deposit areas formed in said GUI where objects which in this case matching images are dragged and dropped. This mode eliminates typing and transmitting of keystrokes. Instead, using a mouse or pointer, the user will drag-and-drop "matched" images from the plurality displayed. As shown, multiple images of people and animals are depicted in the graphic interface. Only the user is familiar with which one or plurality of images mate to other one or a plurality of images. As shown, an image of the user's mother is dragged into in number 1, and an image, depicted in pixels rather than text, of the word "Mom" is dragged into in number 2. The bins or deposit areas on the GUI, are pre-coded to communicate a lookup of the two images which each have predetermined image identifiers to assemble a match on the relational database and the correct authentication string which has been pre-determined.

People unfamiliar with the user or the images, of course may try to match the imaged word grandmother to the depicted woman looking like a grand motherly figure, and to match the image of the dog to the image of the text "Spot" which would cause a denial of access since only predefined matching images are to be matched to communicate image identifiers which are recognized as an authentication string. Further, by making the images of people or places or animals or the like which are well known to the user, and providing an image in pixels of the correct answer only the user will know, especially of text, the system allows for the customized match for access, but, avoids typing and transmitting any text on the keyboard which could be intercepted.

Of course which bin the user is to drag and drop to, and how many of the images are supposed to match from the plurality provided, and then be so dragged, would be determined in advance and held in the relational databases as answers the system is looking for. The bins would be coded in the graphical interface to transmit an image identifier which will be identifiable by the database, and which may be renamed each time and rematched in the database as the correct answers. A large plurality of images and matches known to the user and on file in the database insures that new images and matching images appear each login.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed:

1. A method for generating a changing authentication input or password required for a user accessing a computing device such as a smartphone or computer device, where said computing device is in operative communication with both a display capable of rendering objects in a Graphic User Interface (GUI) and an alphanumeric input component such as a keyboard, and running software adapted for operation and the steps of:

having said user employ said input component to associate an input string with each respective said object in a group of said objects;

electronically storing each respective said input string associated with each respective said object in said group of said objects, in a relational database;

upon access attempts to said computing device, displaying a plurality of said objects from said group of said objects with each respective said object in a respective individual position upon said GUI to form a sequence of said objects displayed on said GUI;

having said user ascertain said sequence for an input of each respective said input string associated by said user with each respective said object in said plurality;

providing an input area in said GUI for said user to input an authentication string formed by employing said input device to input in said sequence, each respective said input string associated with each respective said object in said plurality of individual positions;

generating a comparative authentication string by assembling in said sequence, each of said input strings stored in said relational database which are associated with a respective one of said plurality of objects displayed in said plurality of individual positions; and authenticating said user if said comparative authentication string is determined by said software to match said authentication string input by said user.

2. The method for generating a changing proper authentication input or password of claim 1 additionally comprising the steps of:

changing said sequence for each successive said access attempt.

3. The method for generating a changing proper authentication input or password of claim 1 additionally comprising the steps of:

allowing said user to provide some or all of said objects in said group of said objects using graphically displayable renderings of familiar people or familiar places known to said user, and employing said familiar people or familiar places for said plurality of said objects in said plurality of individual positions thereby providing said user a means for remembering said input string associated with each respective said familiar object or familiar people.

4. The method for generating a changing proper authentication input or password of claim 2 additionally comprising the steps of:

allowing said user to provide some or all of said objects in said group of said objects using graphically displayable renderings of familiar people or familiar places known to said user, and employing said familiar people or familiar places for said plurality of said objects in said plurality of individual positions thereby providing said user a means for remembering said input string associated with each respective said familiar object or familiar people.

5. The method for generating a changing proper authentication input or password of claim 1, additionally comprising the steps of:

including one or a plurality of questions in said group of objects; and electronically storing a respective answer to each respective said question included in said group of objects as said input string associated with each respective said object in said group of said objects, in said relational database.

6. The method for generating a changing proper authentication input or password of claim 2, additionally comprising the steps of:

including one or a plurality of questions in said group of objects; and electronically storing a respective answer to each respective said question included in said group of objects as said input string associated with each respective said object in said group of said objects, in said relational database.

7. The method for generating a changing proper authentication input or password of claim 3, additionally comprising the steps of:

including one or a plurality of questions in said group of objects; and electronically storing a respective answer to each respective said question included in said group of objects as said input string associated with each respective said object in said group of said objects, in said relational database.

8. The method for generating a changing proper authentication input or password of claim 4, additionally comprising the steps of:

including one or a plurality of questions in said group of objects; and electronically storing a respective answer to each respective said question included in said group of objects as said input string associated with each respective said object in said group of said objects, in said relational database.

9. The method for generating a changing proper authentication input or password of claim 1, additionally comprising the steps of:

including one or a plurality of questions in said group of objects; and electronically storing a respective answer from said user to each respective said question included in said group of objects as said input string associated with each respective said object in said group of said objects, in said relational database.

10. The method for generating a changing proper authentication input or password of claim 2, additionally comprising the steps of:

including one or a plurality of questions in said group of objects; and electronically storing a respective answer from said user to each respective said question included in said group of objects as said input string associated with each respective said object in said group of said objects, in said relational database.

11. The method for generating a changing proper authentication input or password of claim 3, additionally comprising the steps of:

including one or a plurality of questions in said group of objects; and electronically storing a respective answer from said user to each respective said question included in said group of objects as said input string associated with each respective said object in said group of said objects, in said relational database.

12. The method for generating a changing proper authentication input or password of claim 4, additionally comprising the steps of:

including one or a plurality of questions in said group of objects; and electronically storing a respective answer from said user to each respective said question included in said group of objects as said input string associated with each respective said object in said group of said objects, in said relational database.

13. The method for generating a changing proper authentication input or password of claim 1, additionally comprising the steps of:

including one or a plurality of alphanumeric characters in said group of objects, each of said alphanumeric characters having a color;

electronically storing either a respective said color, or respective said alphanumeric character itself, as said input string associated therewith as a respective object in said group of said objects, in said relational database; and allowing said user to input either said color, or said alphanumeric character itself, as part of said authentication string.

14. The method for generating a changing proper authentication input or password of claim 2, additionally comprising the steps of:

including one or a plurality of alphanumeric characters in said group of objects, each of said alphanumeric characters having a color;

electronically storing either a respective said color, or respective said alphanumeric character itself, as said input string associated therewith as a respective object in said group of said objects, in said relational database; and allowing said user to input either said color, or said alphanumeric character itself, as part of said authentication string.

15. The method for generating a changing proper authentication input or password of claim 3, additionally comprising the steps of:

including one or a plurality of alphanumeric characters in said group of objects, each of said alphanumeric characters having a color;

electronically storing either a respective said color, or respective said alphanumeric character itself, as said input string associated therewith as a respective object in said group of said objects, in said relational database; and allowing said user to input either said color, or said alphanumeric character itself, as part of said authentication string.

16. The method for generating a changing proper authentication input or password of claim 4, additionally comprising the steps of:

including one or a plurality of alphanumeric characters in said group of objects, each of said alphanumeric characters having a color;

electronically storing either a respective said color, or respective said alphanumeric character itself, as said input string associated therewith as a respective object in said group of said objects, in said relational database; and allowing said user to input either said color, or said alphanumeric character itself, as part of said authentication string.

17. The method for generating a changing proper authentication input or password of claim 5, additionally comprising the steps of:

including one or a plurality of alphanumeric characters in said group of objects, each of said alphanumeric characters having a color;

electronically storing either a respective said color, or respective said alphanumeric character itself, as said input string associated therewith as a respective object in said group of said objects, in said relational database; and allowing said user to input either said color, or said alphanumeric character itself, as part of said authentication string.

18. The method for generating a changing proper authentication input or password of claim 6, additionally comprising the steps of:

including one or a plurality of alphanumeric characters in said group of objects, each of said alphanumeric characters having a color;

electronically storing either a respective said color, or respective said alphanumeric character itself, as said input string associated therewith as a respective object in said group of said objects, in said relational database; and allowing said user to input either said color, or said alphanumeric character itself, as part of said authentication string.

19. The method for generating a changing proper authentication input or password of claim 7, additionally comprising the steps of:

including one or a plurality of alphanumeric characters in said group of objects, each of said alphanumeric characters having a color;

electronically storing either a respective said color, or respective said alphanumeric character itself, as said input string associated therewith as a respective object in said group of said objects, in said relational database; and allowing said user to input either said color, or said alphanumeric character itself, as part of said authentication string.

20. The method for generating a changing proper authentication input or password of claim 9, additionally comprising the steps of:

including one or a plurality of alphanumeric characters in said group of objects, each of said alphanumeric characters having a color;

electronically storing either a respective said color, or respective said alphanumeric character itself, as said input string associated therewith as a respective object in said group of said objects, in said relational database; and allowing said user to input either said color, or said alphanumeric character itself, as part of said authentication string.

21. The method for generating a changing proper authentication input or password of claim 10, additionally comprising the steps of:

including one or a plurality of alphanumeric characters in said group of objects, each of said alphanumeric characters having a color;

electronically storing either a respective said color, or respective said alphanumeric character itself, as said input string associated therewith as a respective object in said group of said objects, in said relational database; and allowing said user to input either said color, or said alphanumeric character itself, as part of said authentication string.

22. The method for generating a changing proper authentication input or password of claim 1, additionally comprising:

said objects being graphically depicted in said GUI in a manner allow a dragging thereof to a new position on said GUI;

having said user ascertain said sequence for an input of each respective said input string associated by said user with each respective said object in said plurality;

providing an input area in said GUI for said user to drag a said object;

said input area coded such that a deposit of a said object at said input area by a dragging thereto, generates a communication of an object identifier which is employed as part of said authentication string; and generating said comparative authentication string by allowing said user to assemble in said sequence, objects having respective said object identifiers which are stored in said relational database and which are associated with each respective one of said plurality of object identifiers communicated.

\* \* \* \* \*